(12) United States Patent
Malmberg et al.

(10) Patent No.: US 11,986,898 B2
(45) Date of Patent: May 21, 2024

(54) LASER BRAZING PROCESS

(71) Applicant: Ningbo Geely Automobile Research & Development Co., Ltd., Ningbo (CN)

(72) Inventors: Niklas Malmberg, Gråbo (SE); Kenneth Kajsjö, Ljungskile (SE); Robert Enbom, Vänersborg (SE)

(73) Assignee: Ningbo Geely Automobile Research & Dev. Co., Ltd., Ningbo (CN)

( * ) Notice: Subject to any disclaimer, the term of this patent is extended or adjusted under 35 U.S.C. 154(b) by 972 days.

(21) Appl. No.: 16/937,173

(22) Filed: Jul. 23, 2020

(65) Prior Publication Data

US 2020/0353550 A1      Nov. 12, 2020

Related U.S. Application Data

(63) Continuation of application No. PCT/CN2019/071816, filed on Jan. 15, 2019.

(30) Foreign Application Priority Data

Feb. 5, 2018  (EP) ..................... 18155157

(51) Int. Cl.
*B23K 1/00*    (2006.01)
*B23K 1/005*   (2006.01)
(Continued)

(52) U.S. Cl.
CPC .......... *B23K 1/0056* (2013.01); *B23K 1/0008* (2013.01); *B23K 1/19* (2013.01);
(Continued)

(58) Field of Classification Search
None
See application file for complete search history.

(56) References Cited

U.S. PATENT DOCUMENTS

2007/0235429 A1  10/2007  Revel
2017/0197269 A1   7/2017  Matsumoto
(Continued)

FOREIGN PATENT DOCUMENTS

CN    1217248 A   5/1999
CN    1990155 A   7/2007
(Continued)

OTHER PUBLICATIONS

Machine translation JP-04033791-A, Oct. 2023 (Year: 2023).*
(Continued)

*Primary Examiner* — Geoffrey S Evans
(74) *Attorney, Agent, or Firm* — Tucker Ellis LLP (57) ABSTRACT

A process for joining first and second metal workpieces by laser brazing for forming a vehicle structure includes providing the workpieces in contacting relationship so as to form an elongated contact region, wherein at least one of the workpieces is made of hot-dip galvanized steel material, supplying a laser beam having a beam parameter product lower than 10 mm·mrad from a laser source, guiding the laser beam through a laser focus head having a total optical magnification in the range of 1:0.5-1:1.5, directing the laser beam along the elongated contact region, wherein a beam spot formed where the laser beam hits the contact region has a size in the range of 2-6 mm, and supplying a consumable wire of filler material to the beam spot to melt the consumable wire and braze the workpieces together, wherein the consumable wire comprises at least 95% copper.

13 Claims, 5 Drawing Sheets

(51) Int. Cl.
    *B23K 1/19*   (2006.01)
    *B23K 26/06*  (2014.01)
    *B23K 35/30*  (2006.01)
    *B23K 101/00*  (2006.01)
    *B23K 103/04*  (2006.01)

(52) U.S. Cl.
    CPC ........ *B23K 26/0648* (2013.01); *B23K 35/302* (2013.01); *B23K 2101/006* (2018.08); *B23K 2103/04* (2018.08)

(56) References Cited

U.S. PATENT DOCUMENTS

| | | | |
|---|---|---|---|
| 2017/0233014 A1 | 8/2017 | Kuwahara | |
| 2019/0061053 A1* | 2/2019 | Yang | B23K 26/244 |

FOREIGN PATENT DOCUMENTS

| | | | | |
|---|---|---|---|---|
| CN | 102935560 A | * | 2/2013 | |
| DE | 102012204927 B3 | * | 7/2013 | B23K 35/004 |
| JP | 04033791 A | * | 2/1992 | |
| JP | 10156543 A | * | 6/1998 | |
| JP | 2003053566 A | | 2/2003 | |
| JP | 2003334657 A | * | 11/2003 | B23K 1/00 |
| JP | 2006346725 A | | 12/2006 | |
| JP | 2011218424 A | * | 11/2011 | |
| JP | 2014101021 A | | 6/2014 | |
| JP | 2018069315 A | | 5/2018 | |
| WO | WO-2018025005 A1 | * | 2/2018 | B23K 26/06 |

OTHER PUBLICATIONS

Machine translation JP-10156543-A, Oct. 2023 (Year: 2023).*
Machine translation JP-2003334657-A, Oct. 2023 (Year: 2023).*
Machine translation JP-2011218424-A, Oct. 2023 (Year: 2023).*
Machine translation of DE-102012204927-B3, Oct. 2023 (Year: 2023).*
Machine translation of CN-102835560-A, Oct. 2023 (Year: 2023).*
Wilfried Reimann: "Influence of different zinc coatings on laser brazing of galvanized steel"; Journal of Materials Processing Technology; dated Aug. 2016, 8 pages.
International Search Report from corresponding International Application No. PCT/CN2019/071816, dated Mar. 27, 2019, 2 pages.
European Search Report from corresponding European Application No. 18155157, dated Jul. 27, 2018, 2 pages.
International Preliminary Report on Patentability from corresponding International Application No. PCT/CN2019/071816, dated May 13, 2020, 10 pages.

* cited by examiner

LASER BRAZING PROCESS

RELATED APPLICATION DATA

This application is a continuation of International Patent Application No. PCT/CN2019/071816, filed Jan. 15, 2019, which claims the benefit of European Patent Application No. 18155157.3, filed Feb. 5, 2018, the disclosures of which are incorporated herein by reference in their entireties.

TECHNICAL FIELD

The disclosure relates to a process for joining a first metal workpiece and a second metal workpiece by laser brazing for forming a vehicle structure. The disclosure also relates to a vehicle comprising a roof panel and a side panel that have been joined by said process.

The process according to the disclosure is thus particularly suitable for laser brazing of a vehicle roof panel to vehicle side panel. However, although the disclosure will be described primarily in relation to mutual joining of a roof panel and a side panel the disclosure is not restricted to this particular application, but may alternatively be used for joining other metal workpieces of a vehicle.

BACKGROUND ART

Laser brazing of the joint connecting the roof panel and the side panel is nowadays common practise and this process provides a high-quality joint that requires little refinishing work before painting and enables a smooth and desirable design.

However, in the field of vehicle manufacturing by laser brazing there is continuous demand for improving the manufacturing process in terms manufacturing quality, product quality and not the least cost and time-efficiency.

Despite the activities in the field, there is still a demand for a further improved process for joining a first metal workpiece and a second metal workpiece by laser brazing for forming a vehicle structure.

SUMMARY OF THE DISCLOSURE

A general object of the present disclosure is to provide an improved process for joining a first metal workpiece and a second metal workpiece by laser brazing for forming a vehicle structure.

In particular, an object of the present disclosure is to provide a manufacturing process where the laser brazing production speed is increased with maintained high-quality joint quality.

Still a further object of the present disclosure is to provide a manufacturing process for joining two metal workpieces by laser brazing where at least one of the first and second metal workpieces is made of hot-dip galvanized steel material. Hot-dip galvanized steel material typically has a thicker zinc coating than a conventional electro-galvanization steel material.

These and other objects, which will become apparent in the following, are accomplished by a process as defined in the accompanying independent claim. Details of some example embodiments and further optional features are recited in the associated dependent claims.

According to a first aspect of the present disclosure, there is provided a process for joining a first metal workpiece and a second metal workpiece by laser brazing for forming a vehicle structure. The process comprises providing the first metal workpiece and the second metal workpiece in contacting relationship so as to form an elongated contact region, wherein at least one of the metal workpieces is made of hot-dip galvanized steel material, supplying a laser beam having a beam parameter product lower than 10 millimetre times milliradians (mm·mrad) from a laser source, guiding the laser beam through a laser focus head having a total optical magnification in the range of 1:0.5-1:1.5, directing the laser beam along the elongated contact region, wherein a beam spot formed where the laser beam hits the contact region has a size in the range of 2-6 mm (millimetres), and supplying a consumable wire of filler material to the beam spot to melt the consumable wire and braze said two metal workpieces together, wherein the consumable wire comprises at least 95% copper.

Galvanization is the process of applying a protective zinc coating to steel metal sheet to increased corrosion resistance. There are various galvanization processes available. Conventionally, the roof panel and side panel of a vehicle have been galvanized by a process called electro-galvanization because this process is characterised by producing a relatively thin zinc coating layer on the steel metal sheets, such as for example in the range of 0.1-0.5 µm (micrometres), and this was desirable because it enabled laser brazing joining of the metal workpieces. An electrogalvanized coating is created by applying zinc to steel sheet by electrodeposition. This is for example performed by submerging the metal workpiece into a zinc plating bath, in which a zinc coating develops as positively charged zinc ions in the bath are electrically reduced to zinc metal and deposited on the positively charged metal workpiece.

Another known galvanization process is hot-dip galvanizing, in which the metal workpieces after cleaning and simply submerged in a bath of molten zinc. Hot-dip galvanization is a faster process and produces a thicker zinc coating layer on the metal workpieces compared with the electro-galvanization process. The resulting zinc coating thickness may for example be in the range of 3-5 µm. However, until now it has not been possible to use a laser brazing process for joining hot-dip galvanized metal workpieces of a vehicle with reasonable production speed and with acceptable soldering joint quality in terms of pore formation and sputter.

After extensive research and experimental laser brazing testing for finding process parameters that enable laser brazing joining of hot-dip galvanized metal workpieces a high product speed a set of parameter settings has now been identified as being central for achieving this objective, namely by using a laser beam having a beam parameter product lower than 10 mm·mrad, using a laser focus head having a total optical magnification in the range of 1:0.5-1: 1.5, having a beam spot size in the range of 2-6 mm and a consumable wire that comprises at least 95% copper. This set-up enables laser brazing of hot-dip galvanized metal workpieces a relatively high process speed of about 3.5-6.5 metres per minute and with a resulting laser brazing joint that has substantially no spatter and no pores, such that the need for post-processing of the finished joint, such as grinding or polishing, is eliminated.

The use of hot-dip galvanized metal workpieces results in improved corrosion resistance and reduced cost, and the relatively high process speed of about 3.5-6.5 metres per minute results in further reduced cost due to increased productivity.

In one example embodiment, the laser beam has a beam parameter product not higher than 8 mm·mrad, and specifically in the range of 2-8 mm·mrad. The Beam Parameter Product (BPP) quantifies the quality of a laser beam and how well it can be focused to a small spot. A relatively low beam parameter product consequently enables use of a relatively small diameter fibre optic cable without losing too much of the laser power at the entrance of the fibre optic cable, because the focused spot should be comparable to the core size to obtain good coupling efficiency into the fibre optic cable. Moreover, since it desirable to have a total optical magnification not too far away from 1:1 in order to obtain a Gaussian laser power distribution at the beam spot and since the beam spot size should be in the range of 2-6 mm, a relatively small core size of the fibre optic cable is needed. For these reasons, having a beam parameter product not higher than 8 mm·mrad, and specifically in the range of 2-8 mm·mrad, enables the desired relatively small the beam spot size and Gaussian laser power distribution at the beam spot without losing to much laser power that the coupling between the laser source and the fibre optic cable.

In one example embodiment, the laser focus head has a total optical magnification in the range of 1:0.7-1:1.3, and specifically in the range of 1:0.9-1:1.1. As discussed above, a total optical magnification not too far away from 1:1 results in a more or less Gaussian laser power distribution at the beam spot, and the extensive research and experimental laser brazing testing for finding appropriate process parameters has surprisingly revealed that a Gaussian laser power distribution at the beam spot improves the quality of the laser brazing joint and enables relatively high process speeds.

Furthermore, a magnification level of about 1:1 also has the advantage of enabling also laser welding by means of the same laser equipment. In other words, this type of magnification enables dual use of the same laser equipment. This is very attractive for manufacturing companies because they can then use substantially the same laser equipment for two different manufacturing processes for increased flexibility. Moreover, the use of the same type of laser equipment for both laser brazing and laser welding results in less need for different types of replacement parts, service partners, etc.

In an example embodiment, the beam spot has a size in the range of 3-5 mm. The extensive research and experimental laser brazing testing for finding appropriate process parameters has revealed that a beam spot size in the range of 3-5 mm results in even less spatter and pores formation while allowing a high process speed.

In an example embodiment, the extensive research and experimental laser brazing testing for finding appropriate process parameters has surprisingly revealed that further improved laser brazing result in terms of reduced spatter and pores formation and high process speed can be obtained if the consumable wire comprises at least 96% copper, and specifically at least 96.5% copper.

In an example embodiment, the at least one metal workpiece made of hot-dip galvanized steel material has a zinc coating in the range of 25-95 g/m$^2$ (grams per square metre), specifically in the range of 35-75 g/m$^2$, and more specifically in the range of 40-60 g/m$^2$. Hot-dip galvanized steel has a relatively large zinc coating thickness compared with electrogalvanized coating and thereby offers an improved corrosion resistance.

In an example embodiment, the at least one metal workpiece made of hot-dip galvanized steel material is a sheet steel with a thickness in the range of 0.3-1.0 mm, specifically in the range of 0.4-0.8 mm, and more specifically in the range of 0.5-0.7 mm.

In an example embodiment, the consumable wire comprises less than 3% silicon, specifically less than 2.5% silicon, and more specifically 1-2.5% silicon. The extensive research and experimental laser brazing testing for finding appropriate process parameters has revealed that the consumable wire shall comprises less than 3% silicon, specifically less than 2.5% silicon, and more specifically 1-2.5% silicon, in order to provide the desired high quality laser brazing seam and high process speed.

In an example embodiment, the consumable wire is of the type ISO 24373; Cu 6511 CuSi2Mn1. This particular type of consumable wire is a copper-silicon-manganese wire that has displayed very good results in terms desired high quality laser brazing seam and high process speed in combination with hot-dip galvanized sheet steel. The typical composition (weight %) of this wire is:

| Silicon (Si) | Tin (Sn) | Manganese (Mn) | Copper (CU) |
| --- | --- | --- | --- |
| 1.7-1.9% | 0.17-0.25% | 0.9-1.1% | Rest |

In an example embodiment, the laser beam at the output of the laser source has a power of at least 2.5 kW, specifically at least 3.5 kW, and more specifically in the range of 3.5-10 kW. The extensive research and testing has showed that at laser power of at least 2.5 kW is necessary to accomplish the desired relatively high process speed. Moreover, further increased process speed is possible with increased laser power without any significant reduction on laser brazing quality.

In an example embodiment, the laser beam at the output of the laser source has a wavelength in the range of 800-1200 nm, and specifically in the range of 900-1100 nm. This type of wavelength has proven to enable the desired high process speed and laser bracing quality.

In an example embodiment, the process comprises guiding the laser beam from the laser source to the laser focus head through a fibre optic cable having a central core diameter of not more than 1 mm, specifically not more than 0.6 mm, and more specifically in the range of 0.2-0.6 mm. The central core diameter determines the minimum beam spot size at the work piece and is thus a relevant parameter for accomplishing a high quality and high speed laser brazing process.

In an example embodiment comprising directing the laser beam along the contact region with a process speed of at least 3.5 m/min (metres per minute), specifically at least 4.5 m/min, and more specifically in the range of 3.5-6.5 m/min. this relatively high process speed has significant effect on the cost for manufacturing a vehicle since the elongated contact region to be joined using laser brazing between the roof panel and side panel is relatively long, and the total process time for producing the laser brazing seam at both lateral sides of the roof can therefore be significantly reduced for improved productivity.

In an example embodiment, the process comprising supplying the consumable wire with a wire feeding rate of 50-100% of the process speed, and specifically 70-90% of the process speed. The extensive research and experimental laser brazing testing for finding appropriate process parameters has revealed that this wire feeding rate results in the desired high quality and high speed laser brazing process.

In an example embodiment, the consumable wire has a wire diameter in the range of 0.8-2.4 mm, specifically in the range of 1.0-1.8 mm, and more specifically in the range of 1.2-1.6 mm. The extensive research and experimental laser brazing testing for finding appropriate process parameters has revealed that this wire feeding rate results in the desired high quality and high speed laser brazing process.

In an example embodiment, a laser beam process direction angle between the laser beam and an outer surface of the first or second metal workpiece, in the process direction, at the beam spot, is in the range of 60-90 degrees, specifically in the range of 65-85 degrees, and more specifically in the range of 70-83 degrees. The extensive research and experimental laser brazing testing for finding appropriate process parameters has revealed that this wire feeding rate results in the desired high quality and high speed laser brazing process.

In an example embodiment, a longitudinal axis of the filler wire adjacent the beam spot leans more forward in the process direction than a direction of the laser beam at the beam spot, and wherein a feed angle between the laser beam and the longitudinal axis of the consumable wire, in the process direction, adjacent the beam spot, is in the range of 10-50 degrees, and specifically in the range of 20-40 degrees. The extensive research and experimental laser brazing testing for finding appropriate process parameters has revealed that this wire feeding rate results in the desired high quality and high speed laser brazing process.

In an example embodiment, one of the first and second metal workpieces is a vehicle roof panel and that the other metal workpiece is a vehicle side panel.

The disclosure is also concerned a vehicle comprising a roof panel and a side panel that have been mutually joined by the process as described above.

Further features of, and advantages with, the present disclosure will become apparent when studying the appended claims and the following description. The skilled person may realize that different features of the present disclosure may be combined to create embodiments other than those described in the following, without departing from the scope of the present disclosure.

BRIEF DESCRIPTION OF THE DRAWINGS

The various example embodiments of the disclosure, including its particular features and example advantages, will be readily understood from the following illustrative and non-limiting detailed description and the accompanying drawings, in which.

DETAILED DESCRIPTION OF EXAMPLE EMBODIMENTS OF THE DISCLOSURE

The present disclosure will now be described more fully hereinafter with reference to the accompanying drawings, in which exemplary embodiments of the disclosure are shown. The disclosure may, however, be embodied in many different forms and should not be construed as limited to the embodiments set forth herein; rather, these embodiments are provided for thoroughness and completeness. Like reference characters refer to like elements throughout the description. The drawings are not necessarily to scale and certain features may be exaggerated in order to better illustrate and explain the exemplary embodiments of the present disclosure.

Figure 1:
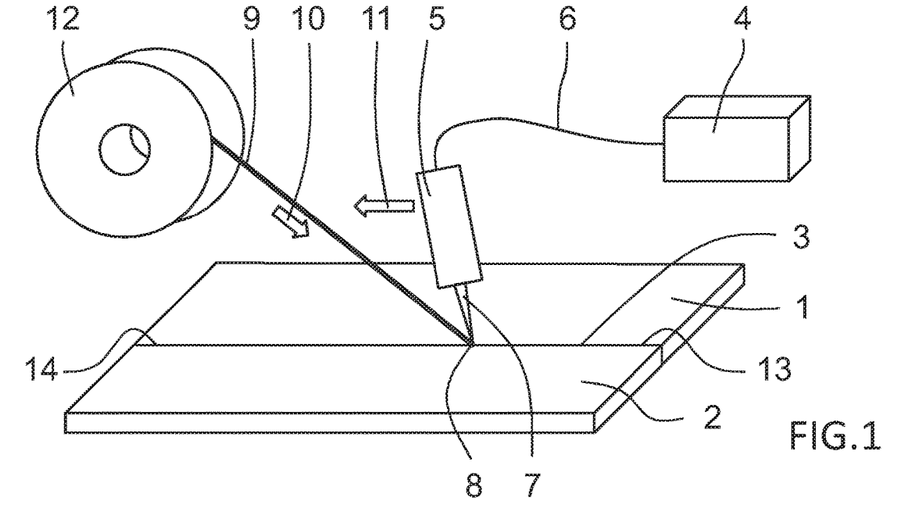
FIG. 1 shows a perspective view of a first example embodiment of a process for joining a first metal workpiece and a second metal workpiece by laser brazing.

FIG. 1 schematically depicts a process for joining a first metal workpiece 1 and a second metal workpiece 2 by laser brazing for forming a vehicle structure. The first and second metal workpieces 1, 2 are provided in contacting relationship so as to form an elongated contact region 3. Moreover, at least one of the metal workpieces 1, 2 is made of hot-dip galvanized steel material. A laser source 4 supplies a laser beam to a laser focus head 5 via a fibre optic cable 6, and a focused single laser beam 7 is directed to the contact region 3. The laser focus head 5 is of a monofocus type, i.e. it supplies a single laser beam. A single beam spot 8 is consequently formed where the laser beam hits the contact region and a consumable wire 9 of filler material is simultaneously supplied to the beam spot along feed direction 10. The heat of the laser beam 7 melts the consumable wire 9 when supplied to the beam spot and the melted filler material penetrates into the gap in the joint between the first and second metal workpieces 1, 2 and wets the joint surfaces.

This is a continuous process that progresses with a certain process speed in a process direction 11 along the elongated contact region 3, from a desired start point 13 to a desired end point 14, and new consumable wire 9 is continuously fed to the beam spot 8 where the consumable wire is melted by the laser beam 7. Typically, both the laser focus head 5, the supply roll 12 of consumable wire and a guiding device (not showed) for guiding and feeding the consumable wire 9 to the beam spot 8 is continuously moved with a process speed in the process direction 11 along the elongated contact region 3, and the first and second metal workpieces 1, 2 are stationary. However, an opposite configuration is possible.

As soon as the laser beam spot 8 has moved past an area of melted filler material the melted filler material directly starts to cool down and subsequently solidify to form a smooth joint with high joint surface quality, high joint corrosion resistance and low or no need for refinishing work.

Figure 2:
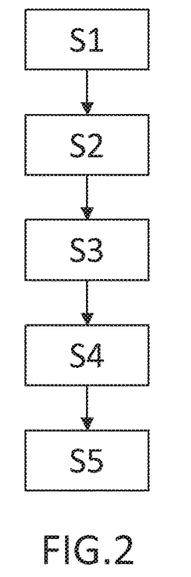
FIG. 2 shows the basic process steps of the laser brazing process according to the disclosure.

The schematic process for joining the first and second metal workpieces 1, 2 by laser brazing for forming a vehicle structure illustrated in FIG. 1 is described more in detail with reference to FIG. 2, which discloses the basic process steps for the joining process.

The process comprises a first step S1 of providing the first metal workpiece 1 and the second metal workpiece 2 in contacting relationship so as to form an elongated contact region 3, wherein one of both of the metal workpieces 1, 2 are made of hot-dip galvanized steel material.

Hot-dip galvanized steel material is a steel material that has been galvanized in a hot-dip galvanizing process. This is typically performed by first cleaning the steel material, such as sheet steel, and subsequently submerging the steep material in a bath of molten zinc. Hot-dip galvanization is a relatively fast process that produces a relatively thick zinc coating layer on the steel material, such as for example in the range of 3-5 µm.

Another option for characterising the resulting zinc layer coating accomplished by hot-dip galvanization is to review the coating thickness in terms of weight per square metre. For example, a metal workpiece made of hot-dip galvanized steel material typically has a zinc coating in the range of 25-95 g/m², specifically in the range of 35-75 g/m², and more specifically in the range of 40-60 g/m².

A second step S2 of the process for joining the first and second metal workpieces 1, 2 by laser brazing comprises supplying a laser beam having a beam parameter product (BPP) lower than 10 mm·mrad from the laser source 4.

Specifically, the laser beam may have a beam parameter product (BPP) not higher than 8 mm·mrad, and more specifically in the range of 2-8 mm·mrad.

The beam parameter product (BPP) of a laser beam is defined as the product of beam radius (measured at the beam waist) and the beam divergence half-angle (measured in the far field). The usual units are mm×mrad (millimetres multiplied with milliradians). The BPP is often used to specify the beam quality of a laser beam: the higher the beam parameter product, the lower is the beam quality.

The laser beam supplied at the output of the laser source 4 may for example have a power of at least 2.5 kW, specifically at least 3.5 kW, and more specifically in the range of 3.5-10 kW. Generally, increased power level of the laser beam enables higher production speed.

The laser beam at the output of the laser source 4 may for example have a wavelength in the range of 800-1200 nm, and specifically in the range of 900-1100 nm.

A third step S3 of the process for joining the first and second metal workpieces by laser brazing comprises guiding the laser beam through the laser focus head 5, which has a total optical magnification in the range of 1:0.5-1:1.5. The laser focus head may alternatively have a total optical magnification in the range of 1:0.7-1:1.3, and specifically in the range of 1:0.9-1:1.1. The total optical magnification of a laser focus head 5 is determined by the ratio between the total focal length of the laser head's collimating lens arrangement and focus lens arrangement, as will be described more in detail below with reference to FIG. 7.

A fourth step S4 of the process for joining the first and second metal workpieces 1, 2 by laser brazing comprises directing the laser beam 7 along the elongated contact region 3. A beam spot 8 is formed where the laser beam 7 hits the contact region has a size in the range of 2-6 mm. The beam spot 8 is generally circular and it is the diameter that defines the size of the beam spot 8. In certain applications, a beam spot 8 has a size in the range of 3-5 mm may be selected. The laser beam 7 is directed along the contact region 3 with a process speed 11 of at least 3.5 m/min, specifically at least 4.5 m/min, and more specifically in the range of 3.5-6.5 m/min. This process speed results in a relatively high productivity of the laser brazing equipment.

A fifth step S5 of the process for joining the first and second metal workpieces 1, 2 by laser brazing comprises supplying a consumable wire 9 of filler material to the beam spot 8 to melt the consumable wire and braze said two metal workpieces 1, 2 together. The consumable wire comprises at least 95% copper. Specifically, the consumable wire may comprise at least 96% copper, and more specifically consumable wire may comprise at least 96.5% copper.

Furthermore, the consumable wire comprises less than 3% silicon, specifically less than 2.5% silicon, and more specifically 1-2.5% silicon. The consumable wire may for example be of the type: ISO 24373; Cu 6511 CuSi2Mn1.

The consumable wire has typically a wire diameter in the range of 0.8-2.4 mm, specifically in the range of 1.0-1.8 mm, and more specifically in the range of 1.2-1.6 mm. Moreover, the consumable wire is generally supplied with a wire feeding rate of 50-100% of the process speed, and specifically 70-90% of the process speed.

Figure 3:
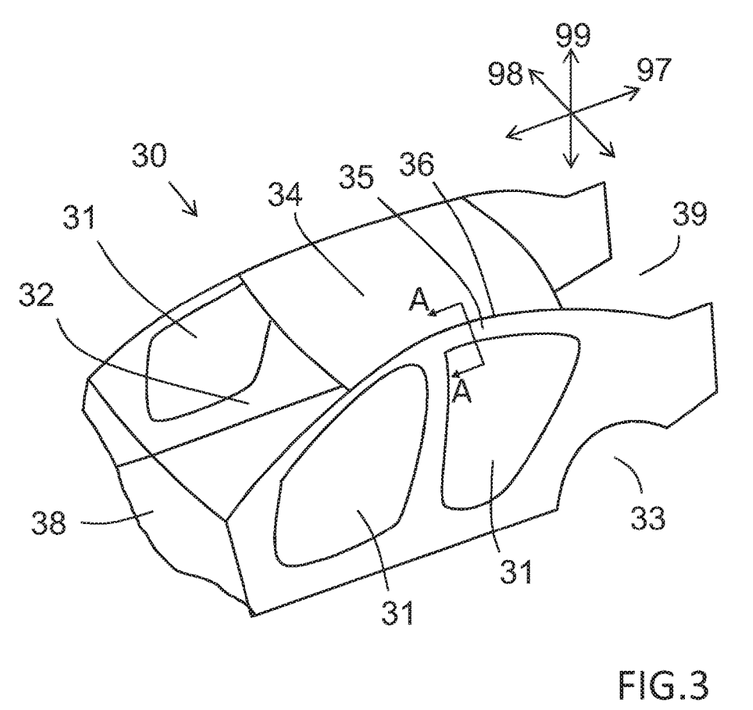
FIG. 3 shows a 3D view of an example embodiment of a specific application of the laser brazing process according to the disclosure.

Turning now to FIG. 3, an example embodiment of a specific application for applying the disclosed laser brazing process is illustrated. FIG. 3 shows schematically an example embodiment of a vehicle structure 30 with a front part 38, a rear part 39, a vehicle length direction 97, a vehicle lateral direction 98 and a vehicle vertical direction 99. The vehicle structure 30 is illustrated in a manufacturing state in which the sheet metal components of the structure have been joined together to a form a rigid structure of the finished vehicle. Details such as doors, hoods, the drive train, vehicle interior, etc. have not yet been assembled to the vehicle structure.

In FIG. 3, holes 31 for the front and rear door can be seen, as well as the hole 32 for the front wind screen and rear wheel compartment 33. FIG. 3 further shows a roof panel 34 a vehicle side panel 35, as well as joint 36 there between.

The disclosed laser brazing process may for example be applied for mutually joining the roof panel 34 and the side panel 35 by means of laser brazing. The first metal workpiece 1 may thus be the roof panel 34 and the second metal workpiece 2 may the vehicle side panel 35.

One or both of the roof panel 34 and side panel 35 may thus be made of hot-dip galvanized sheet steel material. The sheet steel material may for example have a thickness in the range of 0.3-1.0 mm, specifically in the range of 0.4-0.8 mm, and more specifically in the range of 0.5-0.7 mm.

Figure 4:
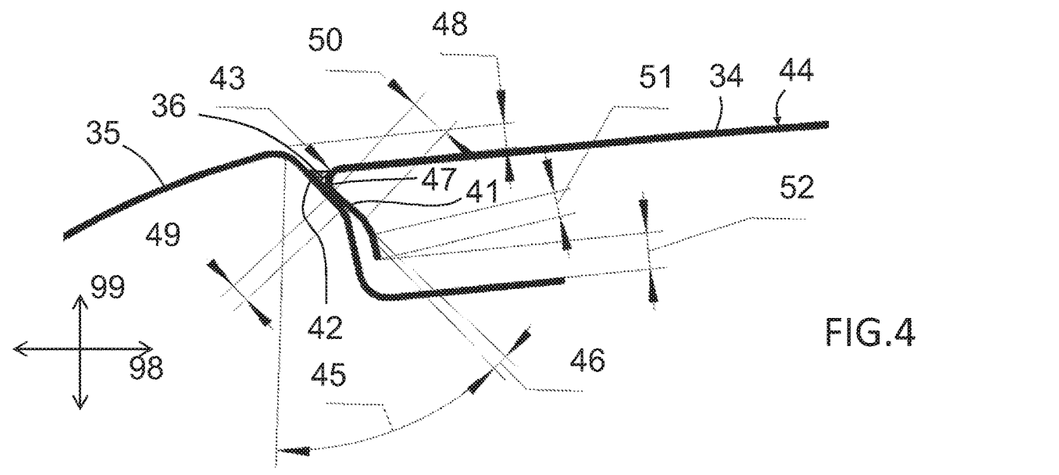
FIG. 4 shows a section along cut A-A in FIG. 3.

FIG. 4 schematically illustrates an example embodiment of a cross-section of the roof panel 34, side panel 35, and laser brazing joint 36 along section A-A shown in FIG. 3. The underlying body reinforcing structure of the vehicle is not showed in FIG. 4.

The geometry and configuration of the roof panel 34 and side panel 35 in the region of the joint 36 can vary but some kind of flange joint may be preferred. In a flange joint a downwardly folded flange 41 of the roof panel 34 abuts and contacts a downwardly folded flange 42 of the side panel 36. This design provides a small cavity between the roof panel 34 and side panel 35 at the joint 36, which cavity may be filled with a laser brazing seam formed of molten filler material of the consumable wire 9.

The roof panel fold 43 between the substantially flat portion of the roof panel facing upwards and the downwardly facing flange 41 of the roof panel 34 may have a radius of not more than 3 mm, specifically not more than 2 mm, and more specifically in the range of 1-2 mm. This parameter is relevant from a laser brazing process perspective because it influences the amount of molten filler material that is required to fill the joint 36. A radius of more than 3 mm may result in too large fill level, such that the finished laser brazing joint is not sufficiently flush with the outer surface 44 of the roof panel 34. On the other hand, a radius of the roof panel fold 43 of less than 1 mm may result in a too small cavity, such that the strength of the laser brazing joint is low.

Parameter 45 denotes the angle of the downwardly folded flange 42 of the side panel 35 with respect to a vertical direction 99 and parameter 46 denotes the angle between the downwardly folded flange 42 of the side panel 35 and the downwardly folded flange 41 of the roof panel 34. Parameter 45 may for example be set to about 30-60 degrees, specifically to about 40-50 degrees, and more specifically about 45 degrees, because these ranges of said angle enables an high level of tolerance in the lateral distance between side panels on the left and right side of the vehicle, since the roof panel 34 may then automatically fit between side panels 35 on the left and right side of the vehicle at a certain height of the roof.

In other words, even if the distance between the side panels 35 on the left and right sides of the vehicle varies somewhat between individual vehicles the roof panel 34 will always fit and will be automatically slightly adjusted in height.

However, a too small angle 45 results in that small variation in lateral distance between the left and right side panels 35 will results in relatively large undesirable vertical position displacement of the roof panel 34. Moreover, a too large angle 45 may result in that the contact point 47 between the roof and side panels 34, 35 will be more difficult to reach for the molten filler material, such that a less strong laser brazing joint is provided. In addition, the reinforcing capacity of the flanges 41, 42 against bending is reduced with increased angle 45.

Furthermore, angle 46 should preferably be positive, specifically in the range of 1-10 degrees, because with a negative angle 46 the contact point 47 between the roof and side panels 34, 35 may be located too far down along the flanges 41, 42, and not be reached by molten filler material.

Parameter 48 may be set to about 2-5 mm because this setting may reduce the risk for complete disintegration of the roof panel to side panel joint in case of a vehicle crash.

Parameter 49 may be set to at least 1 mm, specifically in the range of 1-4 mm, such that the inwardly folded flange 42 of the side panel 35 provides sufficient support to the roof panel 34 in view of the tolerances of the distance between the left and right side panels 35 of the vehicle.

The parameter 50 may be set to at least 3 mm, specifically in the range of 3-10 mm, such that the inwardly folded flange 41 of the roof panel 34 provides sufficient contact surface for supporting the roof panel 34 in view of the tolerances of the distance between the left and right side panels 35 of the vehicle.

The parameter 51 may be set to at least 1 mm, specifically in the range of 1-10 mm, for proving desired reinforcement of the roof panel against bending, etc.

The parameter 52 may be set to at least 1 mm, specifically in the range of 1-10, for avoiding undesired contact between the flanges 41, 42.

Figure 5:
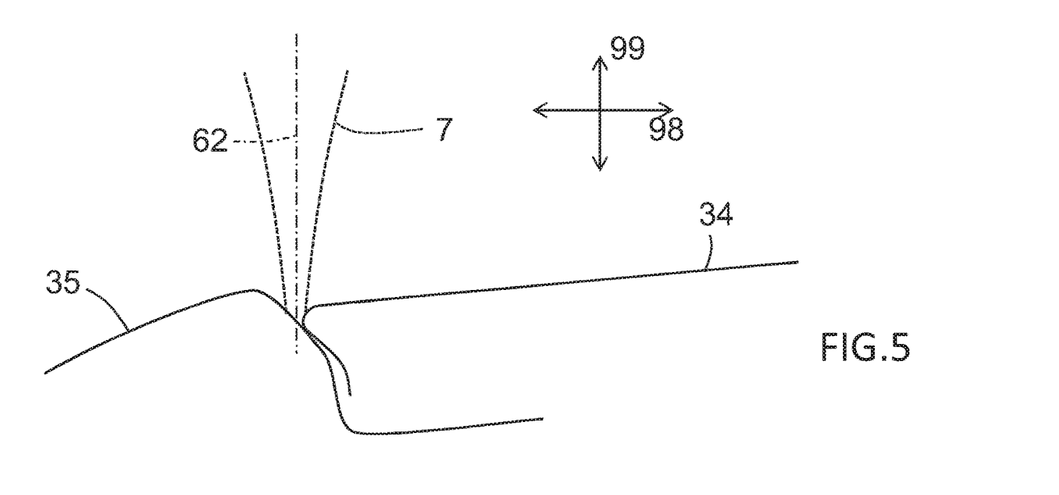
FIG. 5 shows a similar view as FIG. 4 including a schematic laser beam.

FIG. 5 schematically illustrates the cross-section of the roof panel 34, side panel 35, and laser brazing joint 36 along section A-A shown in FIG. 3, and here also with the laser beam 7 included. The laser beam 7 may for example have a direction 62 that is parallel with the vertical direction 99, as seen in the length direction 97 of the vehicle. In other words, the laser beam 7 has zero angle in the lateral direction 98 and does not lean towards the side panel 35 or towards the rood panel 34.

Although the laser brazing process has been described primarily for joining the roof panel and side panel of the vehicle, the laser brazing process according to the disclosure may alternatively be used for joining other metal workpieces of a vehicle, such as for example metal parts forming the rear trunk lid.

Figure 6:
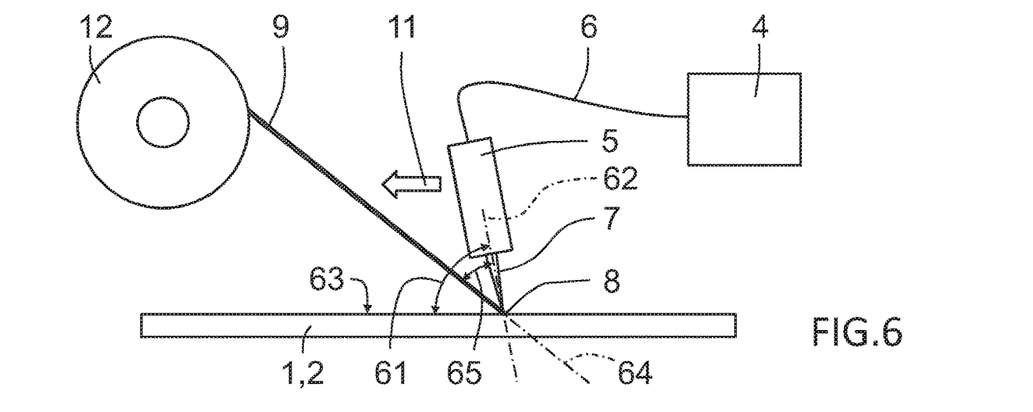
FIG. 6 shows a schematic 2D view of the laser brazing process according to the disclosure.

FIG. 6 schematically illustrates a 2-D view of the laser brazing process according to the disclosure. In FIG. 6 the laser focus head 5 and consumable wire supply roll 12 is moved in a process direction 11 with a certain process speed, whereby the first and second workpieces 1, 2 are stationary. A laser beam process direction angle 61 formed between the direction 62 of the laser beam 7 and an outer surface 63 of the first or second metal workpiece 1, 2, in a plane of the process direction 11, at the beam spot 8, is in the range of 60-90 degrees, specifically in the range of 65-85 degrees, and more specifically in the range of 70-83 degrees. This essentially means that the laser focus head 5 has a forward inclination, i.e. a process direction 11 inclination, or that the direction 62 of the laser beam 7 is perpendicular to the surface of the workpieces 1, 2. The specific ranges have in experimental testing shown to provide excellent laser brazing finish also with high process speed.

A longitudinal axis 64 of the consumable wire 9 adjacent the beam spot 8 leans more forward, in a plane of the process direction 11, than the direction 62 of the laser beam 7. In particular, a feed angle 65 between the direction 62 of the laser beam 7 and the longitudinal axis 64 of the consumable wire 9, in the plane of the process direction 11, adjacent the beam spot 8, may be set in the range of 10-50 degrees, and specifically in the range of 20-40 degrees. The specific ranges have in experimental testing shown to provide excellent laser brazing finish also with high process speed.

Figures 7, 8:
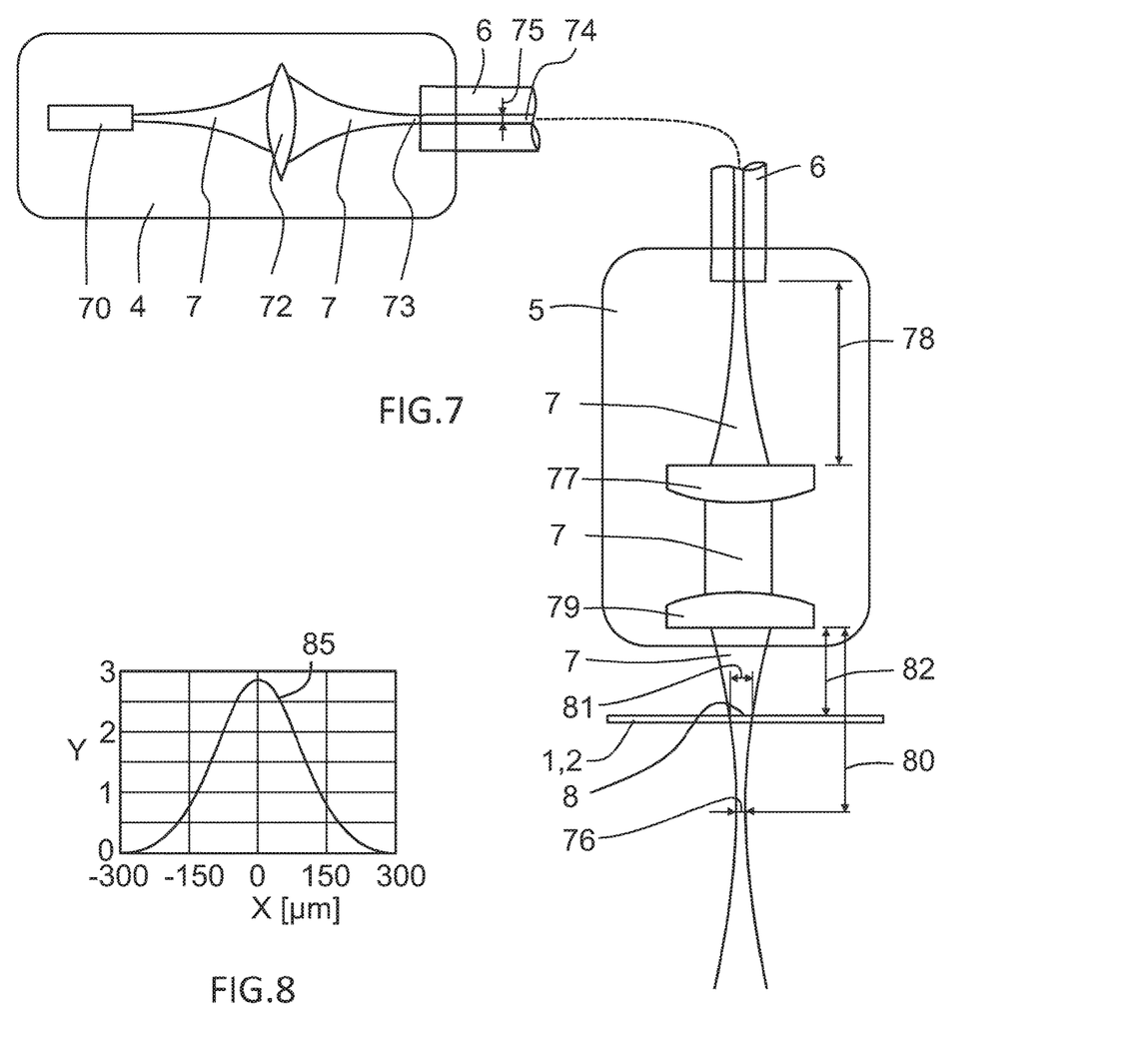
FIG. 7 shows schematic component parts of the laser beam supply equipment.
FIG. 8 shows an example view of Gaussian-type laser beam intensity.

FIG. 7 schematically illustrates an example embodiment of an optical arrangement of the laser source 4 and laser focus head 5. The laser source 4 may have one or more laser emitters 70 that generate a laser beam 7 that is guided through a condensing lens 72 before being guided into the entrance of the fibre optic cable 6.

A beam parameter product not higher than 8 mm·mrad, and specifically in the range of 2-8 mm·mrad, ensures a relatively narrow waist 73 of the laser beam 7, such that the loss of power of the laser beam upon entrance into the fibre optic cable is kept small, considering that the focused spot of the laser beam at the waist 73 should be comparable to the core size of the fibre optic cable to obtain good coupling efficiency of the laser beam into the fibre optic cable.

The fibre optic cable 6 is used for guiding the laser beam from the laser source 4 to the laser focus head 5. This allows significant relative motion between the laser source 4 and laser focus head 5 for improved flexibility. A central core 74 of the fibre optic cable 6 may have a diameter 75 of not more than 1 mm, specifically not more than 0.6 mm, and more specifically in the range of 0.2-0.6 mm.

The diameter of the waist 76 of the laser beam 7 exiting the laser focus head is typically substantially identical to the core diameter of the fibre optic cable 6 if optical magnification of 1:1 is applied in the laser focus head 5. This may be derived from the following equation:

$$\text{Minimum spot size} = \frac{\text{focal length focus lens arrangement}}{\text{focal length collimating lens arrangement}} \times \text{fiber diameter.}$$

Therefore, it may in certain situations be advantageous to keep the diameter 75 of the central core 74 of the fibre optic cable 6 in the range of 0.2-0.6 mm.

An optical magnification in the range of 1:0.5-1:1.5, specifically in the range of 1:0.7-1:1.3, and more specifically in the range of 1:0.9-1:1.1 is deemed advantageous because this does not significantly distort the Gaussian intensity form of the laser beam 7 supplied from the laser source 4. Experimental results show that a Gaussian intensity curve has advantageous effect on the quality of the laser brazing process.

FIG. 8 schematically illustrates the intensity profile of Gaussian laser beam, where the X-axis represent location within the laser beam and the Y-axis represents laser beam intensity. As shown, the intensity 85 is largest at the centre 0 of the beam and the intensity smoothly decays from its maximum at the centre to zero intensity at the circumferential edges of the beam 7. The total thickness of the beam in this example is about 600 μm.

The focus head 5 has a collimating lens arrangement 77 with a first focal length 78 corresponding to the distance between the exit point, i.e. focal point, of the laser beam 7 exiting the fibre optic cable 6 and the collimating lens arrangement 77. The focus head 5 further has a focus lens arrangement 79 with a second focal length 80 defined by the distance between the focus lens arrangement 79 and the waist 76, i.e. focal point of the of the laser beam 7 exiting the laser focus head 7.

It is the ratio between the first focal length 78 and the second focal length 80 that determines the optical magnification of the laser focus head 5. In the illustrated schematic example of the laser focus head both the collimating lens arrangement 77 and the focus lens arrangement 79 are illustrated showing a single lens each. However, each of the collimating lens arrangement 77 and the focus lens arrangement 79 may alternative consists of a plurality of lenses, which combined provides a certain focal length.

The laser beam exiting the fibre optic cable 6 is guided through the collimating lens arrangement 77 and subsequently through the focus lens arrangement 79 to form the laser beam 7 exiting the laser focus head 5. The laser beam 7 exiting the laser focus head 5 is directed towards the elongated contact region of the first and second workpieces 1, 22, and a beam spot 8 formed where the laser beam hits the contact region has a beam spot size 81 in the range of 2-6 mm, specifically in the range of 3-5 mm.

Since the waist dimension 76 of the laser beam 7, which for example may be about 0.2-0.6 mm with an optical magnification near 1:1, may be much smaller than the desired beam spot size of 3-5 mm, the first and second workpiece 1, 2 may have to be located at a smaller distance 82 from the focusing lend arrangement 79 than the second focal length 80.

The specific process parameters underlying the laser brazing process according to the disclosure have been identified by conducting extensive research and experimental laser brazing testing, wherein the aim specifically was to identify process parameters that would enables laser brazing of hot-dip galvanised steel with high process speed and high brazing joint finish.

Specific examples of the result of the experimental results are shown in FIGS. 9-12. All FIGS. 9-12 show experimental results of an identified process window representing acceptable laser brazing results in terms of brazing seam quality, e.g. little amount of spatter, little amount of pores formation and little or no need for refinishing work. The charts shown in FIGS. 9-12 illustrate specific examples of the upper and lower limit of the acceptable process window in a process for joining two metal workpieces made of hot-dip galvanised steel by laser brazing for forming a vehicle structure, wherein the X-axis of the chart represents process speed in metres/minute and the Y-axis in the chart represents laser power in kW. No shield gas has been used in any test.

Figure 9:
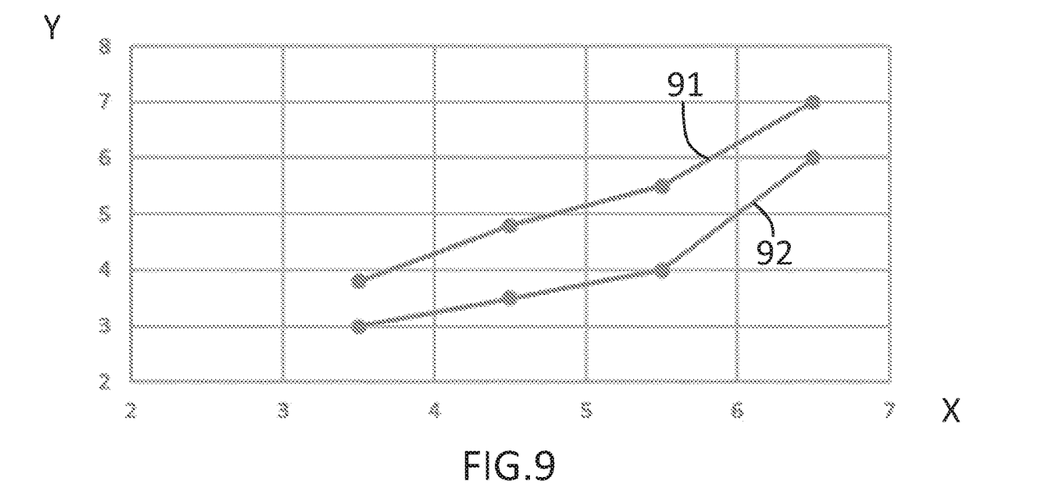
FIG. 9-12 show specific examples of acceptable process windows derived from the experimental results.

FIG. 9 shows a specific example of an identified acceptable process window for varying process speed and laser power using the following specific test parameter setting:

Consumable wire: ISO 24373; Cu 6511 CuSi2Mn1 (diameter 1.6 mm)
Consumable wire feed speed: about 80% of process speed
Optical magnification in the laser focus head: 1:1,
Single spot laser beam with 4 mm spot size,
Fibre optic cable with 0.2 mm core diameter,
Laser beam lateral angle: 0 degree
Laser beam process direction angle: 15 degrees
Beam parameter product: 2 mm·mrad
Roof panel fold radius: 2 mm Line 91 in FIG. 9 represents the upper limit of the acceptable process window and line 92 represents the lower limit of the acceptable process window. Hence, targeting for example a process speed of 5.5 metres/minute the laser power should be kept between 4-5.5 kW for obtaining an acceptable laser brazing result. Higher laser power than 5.5 kW may for example result in too much spatter and lower laser power than 4 kW may for result in pores formation.

The specific example process window shown in FIG. 9 represents a very good process setting for joining two metal hot-dip galvanized workpieces by laser brazing for forming a vehicle structure. The process window shows that by means of the above-defined specific process acceptable laser brazing quality in accomplished over a large range of process speed 11, i.e. from 3.5 metres/minute up to 6.5 metres/minute, merely by adapting the laser power in the range from 3-7 kW.

Experimental results show that that some process parameters are more relevant than others for accomplishing acceptable laser brazing quality of hid-dip galvanized steel while having a relatively high process speed. The following process parameters have been identified as more relevant: Beam parameter product, optical magnification level, beam spot size and material of the consumable wire. Experimental results show that acceptable process window is accomplished also when said relevant process parameters are varied to a certain extent. In particular, acceptable process window is accomplished when having beam parameter product lower than 10 mm·mrad, an optical magnification in the range of 1:0.5-1:1.5, a beam spot size in the range of 2-6 mm and a consumable wire comprising at least 95% copper.

Figure 10:
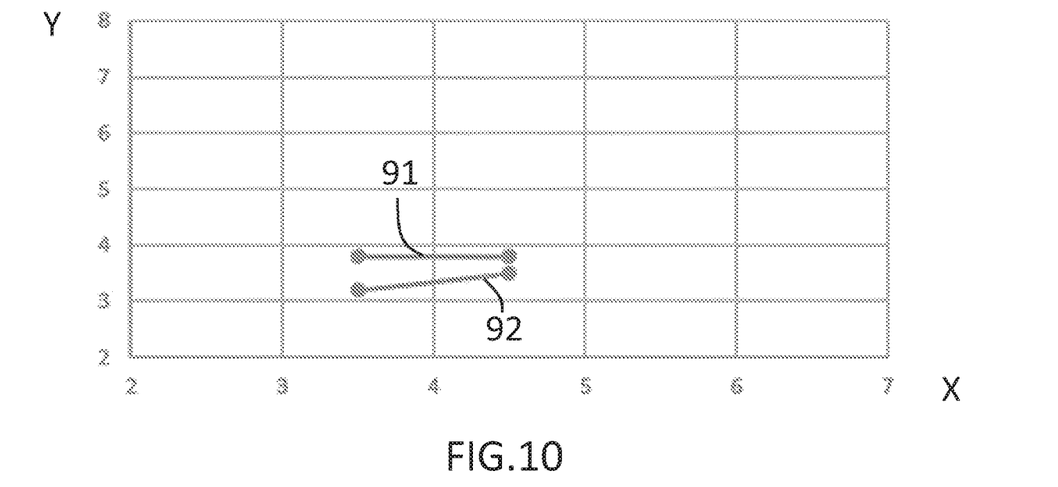

FIG. 10 shows a specific example of an identified acceptable process window for varying process speed and laser power using similar specific test parameter setting as described in relation to FIG. 9, but using optical magnification in the laser focus head of 1:3 instead, wherein line 91 represents the upper limit of the acceptable process window and line 92 represents the lower limit of the acceptable process window. An optical magnification of 1:3 means that the laser beam 7 leaving the laser focus head 5 has a diameter of the waist 76 substantially equal to three times the core diameter 75 of the fibre optic cable 6, i.e. about 3×0.6 mm=1.8 mm in the specific experimental test setting. The distance 82 between the first and second workpiece 1, 2 and the focusing lens arrangement 79 than must be adjusted to obtain the desired beam spot size.

The specific example process window showed in FIG. 10 shows that optical magnification of 1:3 results in a very narrow acceptable process window that does not allow higher process speed than 4.5 metres/min.

Figure 11:
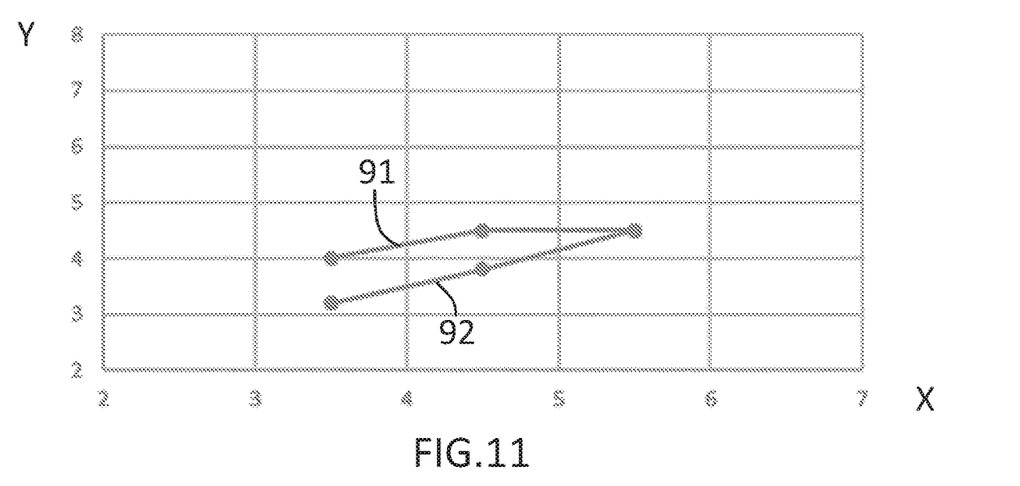

FIG. 11 shows a specific example of an identified acceptable process window for varying process speed and laser power using similar specific test parameter setting as described in relation to FIG. 9, but using optical magnification in the laser focus head of 1:5 instead, wherein line 91 represents the upper limit of the acceptable process window and line 92 represents the lower limit of the acceptable process window. An optical magnification of 1:5 means that the laser beam 7 leaving the laser focus head 5 has a diameter of the waist 76 substantially equal to five times the core diameter 75 of the fibre optic cable 6, i.e. about 5×0.6 mm=3.0 mm in the specific experimental test setting. The distance 82 between the first and second workpiece 1, 2 and the focusing lens arrangement 79 than must be adjusted to obtain the desired beam spot size.

The specific example process window showed in FIG. 11 shows that optical magnification of 1:5 results in a relatively narrow acceptable process window that does not allow higher process speed than 5.5 metres/min.

Figure 12:
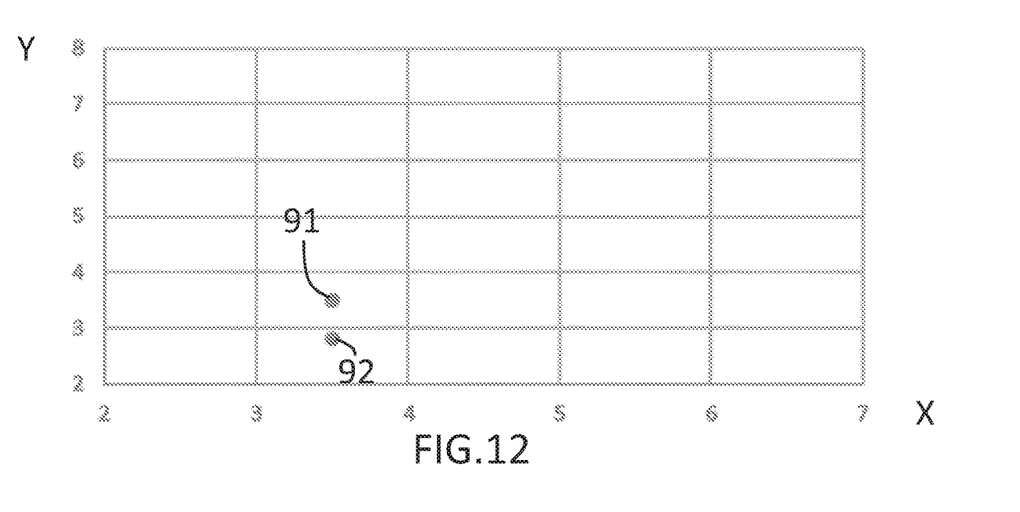

FIG. 12 shows a specific example of an identified acceptable process window for varying process speed and laser power using similar specific test parameter setting as described in relation to FIG. 9, wherein the optical magnification in the laser focus head was 1:1, but the consumable wire material was different, namely: ISO 24373; Cu 6560 CuSi3Mn1 (diameter 1.6 mm). The typical composition (weight %) of this wire is:

| Silicon (Si) | Iron (Fe) | Manganese (Mn) | Zinc (Zn) | Copper (CU) |
|---|---|---|---|---|
| 2.7-3.2% | ≤0.2% | 0.7-1.3% | ≤0.4% | Rest |

The specific example process window showed in FIG. 12 shows that consumable CuSi3Mn1 results in a very restrictive acceptable process window with a maximal process speed of only 3.5 metres/min. Line 91 represents the upper limit of the acceptable process window and line 92 represents the lower limit of the acceptable process window.

Although the disclosure has been described in relation to specific combinations of components, it should be readily appreciated that the components may be combined in other configurations as well which is clear for the skilled person when studying the present application. Thus, the above description of the example embodiments of the present disclosure and the accompanying drawings are to be regarded as a non-limiting example of the disclosure and the scope of protection is defined by the appended claims. Any reference sign in the claims should not be construed as limiting the scope.

The invention claimed is:

1. A process for joining a first metal workpiece and a second metal workpiece by laser brazing for forming a vehicle structure, comprising
providing the first metal workpiece and the second metal workpiece in contacting relationship so as to form an elongated contact region, wherein at least one of the first and second metal workpieces is made of hot-dip galvanized steel material,
supplying a laser beam having a beam parameter product lower than 10 mm·mrad from a laser source,
guiding the laser beam through a laser focus head having a total optical magnification in the range of 1:0.5-1:1.5,
directing the laser beam along the elongated contact region, wherein a beam spot formed where the laser beam hits the elongated contact region has a diameter size in the range of 2-6 mm, and
supplying a consumable wire of filler material to the beam spot to melt the consumable wire and braze said first and second metal workpieces together, wherein the consumable wire comprises at least 95% copper.

2. The process according to claim 1, wherein the beam parameter product of the laser beam is not higher than 8 mm·mrad, wherein the total optical magnification of the laser focus head is in the range of 1:0.7-1:1.3, wherein the diameter size of the beam spot is in the range of 3-5 mm, and wherein the consumable wire comprises at least 96% copper.

3. The process according to claim 1, wherein the at least one of the first and second metal workpieces made of hot-dip galvanized steel material has a zinc coating with a thickness in the range of 25-95 g/m².

4. The process according to claim 1, wherein the at least one of the first and second metal workpieces made of hot-dip galvanized steel material is made of sheet steel with a thickness in the range of 0.3-1.0 mm.

5. The process according to claim 1, wherein the consumable wire comprises less than 3% silicon.

6. The process according to claim 1, wherein the laser beam at the output of the laser source has a power of at least 2.5 kW.

7. The process according to claim 1, comprising guiding the laser beam from the laser source to the laser focus head through a fibre optic cable having a central core diameter of not more than 1 mm.

8. The process according to claim 1, wherein the laser beam is directed along the elongated contact region with a process speed of at least 3.5 m/min.

9. The process according to claim 1, wherein the laser beam is directed along the elongated contract region at a process speed, and wherein the consumable wire is supplied with a wire feeding rate of 50-100% of the process speed of the laser beam.

10. The process according to claim 1, wherein the consumable wire has a wire diameter in the range of 0.8-2.4 mm.

11. The process according to claim 1, wherein a laser beam process direction angle between the laser beam and an outer surface of the first or second metal workpiece, in a plane of the process direction, at the beam spot, is in the range of 60-90 degrees.

12. The process according to claim 1,
wherein the laser beam is directed along the elongated contact region in a process direction,
wherein a longitudinal axis of the consumable wire adjacent the beam spot has a larger forward inclination, in a plane of the process direction, than a direction of the laser beam at the beam spot, and
wherein a feed angle between the direction of the laser beam and the longitudinal axis of the consumable wire, in the plane of the process direction, adjacent the beam spot, is in the range of 10-50 degrees.

13. The process according to claim 1, wherein one of the first and second metal workpieces is a vehicle roof panel and that the other metal workpiece is a vehicle side panel.

* * * * *